(12) United States Patent
Weh et al.

(10) Patent No.: US 10,490,371 B2
(45) Date of Patent: Nov. 26, 2019

(54) ELECTRICAL SWITCH

(71) Applicant: Marquardt GmbH, Rietheim-Weilheim (DE)

(72) Inventors: Claus Weh, Tuttlingen (DE); Regina Werni, Bondorf (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 15/993,790

(22) Filed: May 31, 2018

(65) Prior Publication Data

US 2018/0330900 A1 Nov. 15, 2018

Related U.S. Application Data

(63) Continuation of application No. PCT/EP2016/080776, filed on Dec. 13, 2016.

(30) Foreign Application Priority Data

Dec. 14, 2015 (DE) .......................... 10 2015 016 128

(51) Int. Cl.
*H01H 21/24* (2006.01)
*H01H 21/22* (2006.01)
(Continued)

(52) U.S. Cl.
CPC ........... *H01H 21/24* (2013.01); *B60R 16/005* (2013.01); *H01H 21/04* (2013.01); *H01H 21/22* (2013.01);
(Continued)

(58) Field of Classification Search
CPC ........ H01H 21/24; H01H 21/50; H01H 21/40; H01H 21/42; H01H 23/30; H01H 23/20; H01H 23/205
See application file for complete search history.

(56) References Cited

U.S. PATENT DOCUMENTS 6,459,060 B1 10/2002 Bartok
6,967,298 B2 * 11/2005 Schmidt .................. H01H 1/18
200/330
(Continued)

FOREIGN PATENT DOCUMENTS

DE 10 2004 036 844 A1 3/2006
DE 10 2014 002 870 A1 9/2014
(Continued)

OTHER PUBLICATIONS

German Search Report (Application No. 10 2015 016 128.8) dated Jul. 29, 2016.
(Continued)

*Primary Examiner* — Felix O Figueroa
(74) *Attorney, Agent, or Firm* — Burr & Brown, PLLC (57) ABSTRACT

The invention relates to an electrical switch, in particular for a motor vehicle, such as for an electric parking brake in the motor vehicle, having a movable operating member, in particular in the manner of a rocker, and a contact system, such that the operating member interacts with the contact system in a switching manner. The operating member interacts via an operating element, which is loaded with an elastic force, with a slotted link for generating a resetting force during the movement of the operating member out of an inoperative position. A further slotted switching link is provided. The operating member has a further operating element in such a manner that each of the two operating elements interacts with one slotted switching link each.

14 Claims, 5 Drawing Sheets

(51) Int. Cl.
*H01H 21/50* (2006.01)
*B60R 16/00* (2006.01)
*H01H 21/04* (2006.01)
*H01H 21/40* (2006.01)

(52) U.S. Cl.
CPC .......... *H01H 21/50* (2013.01); *H01H 21/40* (2013.01); *H01H 2021/225* (2013.01); *H01H 2235/018* (2013.01); *H01H 2300/002* (2013.01)

(56) References Cited

U.S. PATENT DOCUMENTS

| | | | | |
|---|---|---|---|---|
| 8,247,713 | B2* | 8/2012 | Ui | H01H 21/50 |
| | | | | 200/5 R |
| 8,704,118 | B2* | 4/2014 | Konno | H01H 23/162 |
| | | | | 200/339 |
| 9,685,285 | B2* | 6/2017 | Barile | H01H 13/04 |
| 2005/0045463 | A1 | 3/2005 | Schmidt et al. | |
| 2010/0258424 | A1 | 10/2010 | Ui et al. | |
| 2012/0217144 | A1 | 8/2012 | Konno | |
| 2016/0035515 | A1 | 2/2016 | Barile et al. | |

FOREIGN PATENT DOCUMENTS

| | | |
|---|---|---|
| EP | 2 468 590 A1 | 6/2012 |
| JP | H07-245041 A1 | 9/1995 |
| WO | 2015/036911 A1 | 3/2015 |

OTHER PUBLICATIONS

International Search Report and Written Opinion (Application No. PCT/EP2016/080776) dated Mar. 17, 2017.
English translation of Chinese Office Action (Application No. 201680081754.1) dated Apr. 22, 2019.

* cited by examiner

Fig. 5

ELECTRICAL SWITCH

CROSS REFERENCE TO RELATED APPLICATIONS

This application is a continuation of International Application No. PCT/EP2016/080776 filed Dec. 13, 2016, which designated the United States, and claims the benefit under 35 USC § 119(a)-(d) of German Application No. 10 2015 016 128.8 filed Dec. 14, 2015, the entireties of which are incorporated herein by reference.

FIELD OF THE INVENTION

The present invention relates to an electrical switch.

BACKGROUND OF THE INVENTION

Electrical switches of this type are used, for example, as operator control switches in motor vehicles. In particular, the switch can be used for operation of an electric parking brake in the motor vehicle by a user.

Such an electrical switch has an operating member which is movable from an inoperative position into a switching position and is moved manually by the user for operating the electric parking brake. The operating member can be configured in the manner of a rocker. The switch comprises a contact system, wherein the operating member interacts during the movement thereof into the switching position with the contact system in a switching manner. The operating member interacts via an operating element, which is loaded with an elastic force, with a slotted link in the manner of a slotted switching link for generating a resetting force during the movement of the operating member out of the inoperative position. As a result, after operation by the user, the operating member is automatically returned into its inoperative position. It has turned out that, during the resetting of the operating member into the inoperative position, noises occur which may be perceived as unpleasant by the user. Furthermore, defects in the exactness of the resetting into the inoperative position may also occur.

SUMMARY OF THE INVENTION

The present invention is based on the object of developing the switch in such a manner that the switching noise is reduced. In particular, the play of the operating member in the inoperative position is also intended to be reduced.

In the case of the electrical switch according to the present invention, a further slotted link in the manner of a slotted switching link is provided. Furthermore, a further operating element for the further slotted link is arranged on the operating member in such a manner that each of the two operating elements interacts with the respective slotted link in the inoperative position and/or during the movement of the operating member out of the inoperative position.

In a further refinement, the operating member can be movable in an ergonomic manner in two mutually opposite directions, in particular, by pulling and/or pushing, starting from the inoperative position, for the operation thereof. The two slotted links can be designed in an opposed manner with respect to each other such that, during the movement in the two directions, in particular, during the pulling and during the pushing, of the operating member, comparable force-travel characteristics with positive and/or negative force values arise for the operating member. It is particularly preferred for the two slotted links to be designed mirror-symmetrically with respect to each other with respect to the inoperative position. A refinement of this type ensures a stable inoperative position with little play.

The operating element can comprise a pin arranged movably with respect to the operating member, and a movement element which is mounted rotatably on the pin on the side lying opposite the operating member. The movement element can be a roller, a ball or the like, and therefore only small frictional forces occur during the movement of the operating member. The movement element can lie against the slotted link by means of the elastic force. The elastic force can be generated by a compression spring arranged on the pin. This creates a functionally reliable and low-wearing refinement having good haptics.

For the purpose of further reducing the play for the inoperative position, the slotted link can have a rising flank. Furthermore, the slotted link can comprise a substantially flat track, wherein, in particular, the flat track can have a smaller slope than the rising flank. For the purpose of particular stability of the inoperative position of the operating member, in each case one of the rising flanks of the two individual slotted links can be used. In particular, it may be appropriate for this purpose for the respective movement element to lie against the respective rising flank.

In a further expedient refinement, the rising flank of the slotted link can merge into a more shallow flank and subsequently into a steeper flank. In particular, a reduced resetting force is thereby generated in the switching position assigned to the more shallow flank. Furthermore, the flat track lying opposite the rising flank can merge into an in turn steep flank. For the purpose of little production of noise during the movement of the operating member, the transitions between the flat track and the flanks can each be of rounded design. The rounding can preferably have a radius which is greater than the radius of the movement element. The two slotted links can be arranged approximately in a mirror-inverted manner with respect to each other with respect to the center of the flat track.

To protect against external influences, a housing can be provided for the switch. The operating member can expediently be mounted movably in and/or on the housing. The operating member can in turn act in a switching manner on the contact system in the switching position by means of a tappet, a lug or the like.

The contact system can be arranged in a compact manner on a printed circuit board. The printed circuit board can be located in the housing. Furthermore, an electrical plug-in connection can be arranged on the printed circuit board for transmitting the switching signals generated during the switching of the contact system. Expediently, the plug-in connection can project out of the housing for the connection of a plug.

In a simple refinement, the contact system can comprise at least one contact surface on the printed circuit board as a fixed contact, and also a switching contact which interacts with the fixed contact. In a cost-effective manner, the switching contact can be configured in the manner of a switching mat. The contact system can also be configured in the manner of a switching element, for example as a microswitch, a snap-action switch or the like. The switching element can be arranged in a simple manner on the printed circuit board.

For a particularly preferred refinement of the switch according to the present invention, the following should be noted.

In the case of known systems, the stable inoperative position, i.e. the pretensioning for the operating member, and pleasant switching noises are contradictory. The challenge consists in, in addition to a small zero positional play of the switching rocker, also realizing a low or pleasant formation of noise.

Low or pleasant switching noises in a stable inoperative position, i.e. during pretensioning in the zero position, of the switching rocker are generated by the interaction of at least two individual slotted links and two actuators. In the specific case, two asymmetrically designed slotted links which are rotated counter to each other interact in such a manner that, for pulling and/or pushing the switching rocker, comparable force-travel characteristics with positive and negative force values arise.

For a stable inoperative position of the operating member, i.e., for example, for the zero position of the rocker, use is in each case made of a flank of the two individual slotted links. Specifically, in the specific case, the rising flank in each case. The angles which constitute the counterflank during the return are responsible in addition to the material of the slotted link and of the actuator, which may comprise a roller, for the generation of noise. In the case of the arrangement described, the angles can be designed to be significantly greater than in the case of the known symmetrical slotted link geometries. The angle and/or the transition in the vicinity of the inoperative position can be provided with a radius which is larger than the actuator contour or the actuator radius, i.e. in the specific case is larger than the roller diameter, without disadvantages for the stable inoperative position. This leads overall to a harmonious slotted link contour which results in a lower or more pleasant generation of noise during the operation and/or particularly during the resetting or releasing of the operating member.

A switch for an electronic parking brake (EPB) is thus created with a slotted switching link which permits a stable inoperative position with low switching noises.

The advantages obtained with the present invention consist, in particular, in that a lower or more pleasant generation of noise occurs during the operation and/or during the release of the operating member by the user. Furthermore, a stable inoperative position of the operating member and improved haptics for the user during operation of the operating member are provided.

In an advantageous manner, in the case of the switch according to the invention, low switching noises and a stable inoperative position or zero position for the operating member are achieved by the interaction of two individual asymmetric slotted links with the operating member. The angle between the rising flank and the flat track, which is the cause of the generation of noise, can be selected to be significantly larger in the case of the refinement according to the invention than in the case of the previous symmetrical slotted link geometry configured in an approximately V-shaped manner. This permits a lower and/or more pleasant generation of noise during the operation of the operating member and/or during the resetting of the operating member. This angle which is also the cause for the inoperative position can be configured with a radius which is greater than the radius of the contour of the movement element, which brings about a harmonious transition with better and/or more pleasant generation of noise. By means of the interaction of the two individual asymmetric slotted links, a stable inoperative position of the operating member can be realized, for which purpose the different directions of action of the two slotted links in the inoperative position are used.

BRIEF DESCRIPTION OF THE DRAWINGS

An exemplary embodiment of the present invention with various developments and refinements is illustrated in the drawings and is described in more detail below.

DETAILED DESCRIPTION OF THE INVENTION

Figure 1:
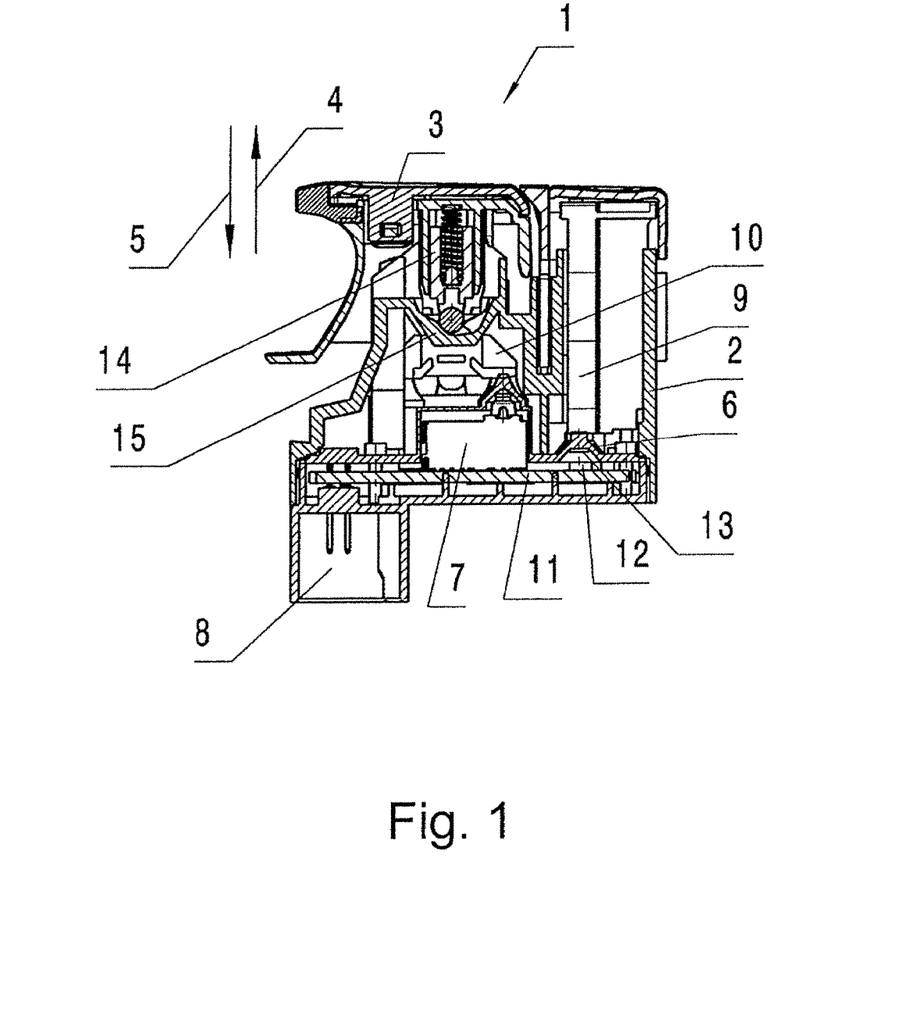
FIG. 1 shows a longitudinal section through an electrical switch.

An electrical switch 1 which serves in a motor vehicle for operation of an electric parking brake by a user can be seen in FIG. 1. The switch 1 has a housing 2 on which an operating member 3 is mounted movably. The operating member 3 which is configured in the manner of a rocker is movable manually by the user starting from the inoperative position shown in FIG. 1 in two mutually opposite directions into a respective switching position. Specifically, the operating member 3 is movable manually by the user by pulling and/or pushing for the operation thereof, in the present case by pulling in the direction 4 and by pushing in the direction 5.

A contact system 6, 7 is located in the housing 2. In the switching position, the operating member 3 interacts with the contact system 6, 7 in a switching manner by means of a tappet 9, lug 10 or the like such that one of the two contact systems 6, 7 is operated during the pulling of the operating member 3 and the other of the two contact systems 6, 7 is operated during the pushing of the operating member 3. The respective operated contact system 6, 7 then generates a switching signal which serves in turn for activating the respective functions of the electronic parking brake. The switching and/or control signals for the electronic parking brake are transmitted via an electric plug-in connection 8 which projects on the housing 2 for the connection of a plug. The plug-in connection 8 and the contact system 6, 7 are arranged on a printed circuit board 11 located in the housing 2. The contact system 6 comprises at least one contact surface 12 on the printed circuit board 11 as a fixed contact, and also a switching contact 13 which interacts with the fixed contact 12 and is configured in the manner of a switching mat. The further contact system 7 consists of an electrical switching element, in particular, a microswitch, a snap-action switch or the like, wherein the switching element 7 is arranged on the printed circuit board 11.

Figure 2:
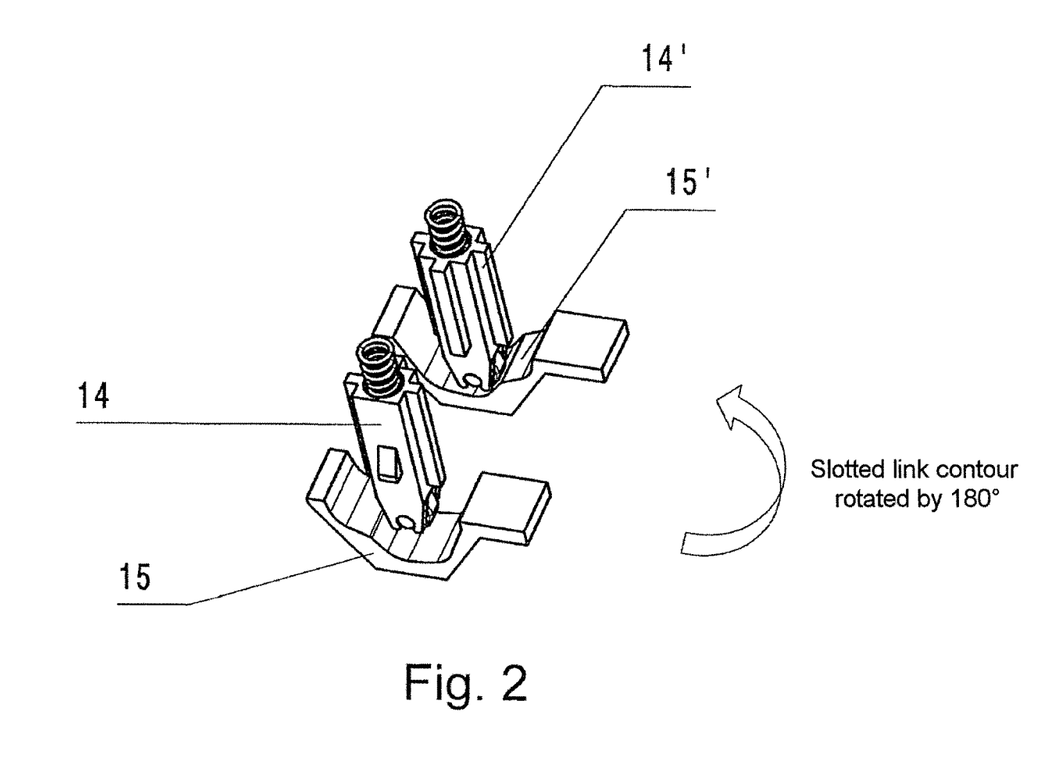
FIG. 2 shows a cutout of a detail of the switch from FIG. 1 in a perspective view.

The operating member 3 interacts via an operating element 14, which is loaded with an elastic force, with a slotted link 15, which is located in the housing 2, in the manner of a slotted switching link for generating a resetting force during the movement of the operating member 3 out of the inoperative position. In the case of the switch 1 according to the invention, a further slotted link 15' in the manner of a slotted switching link is now provided, as can be seen in FIG. 2. A further operating element 14' for the further slotted link 15' is arranged on the operating member 3 in such a manner that each of the two operating elements 14, 14' interacts with the respective slotted link 15, 15' in the inoperative position and/or during the movement of the operating member 3 out of the inoperative position, as is likewise seen with reference to FIG. 2. The slotted links 15, 15' and the associated operating elements 14, 14' are arranged one behind the other here in the housing 2.

Figure 5:
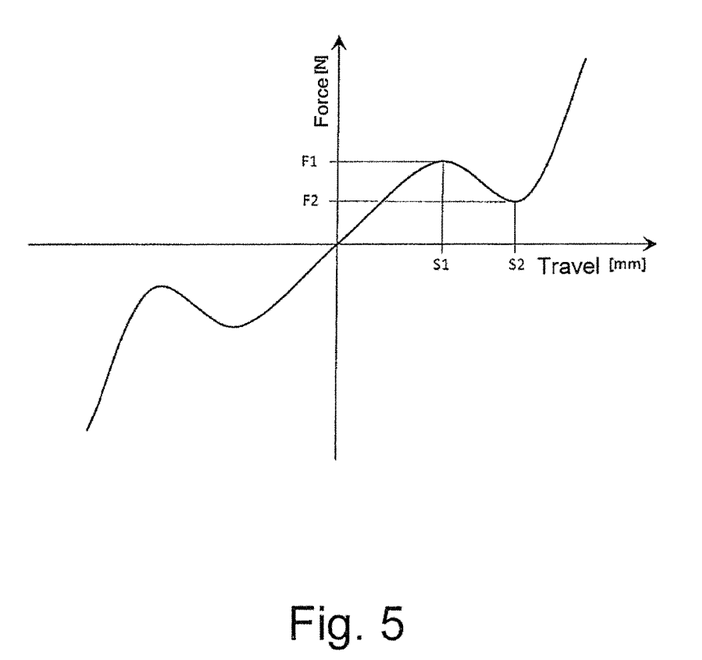
FIG. 5 shows a force-travel diagram for the operation of the switch from FIG. 1.

As is furthermore seen in FIG. 2, the two slotted switching links 15, 15' are designed in an opposed manner with respect to each other, specifically such that the slotted link contour of the one slotted switching link 15 appears rotated by approximately 180° in relation to the other slotted switching link 15'. In particular, the two slotted switching links 15, 15' are formed mirror-symmetrically with respect to each other with respect to the inoperative position, as is seen with reference to FIG. 3, where the one slotted switching link 15 is shown by solid lines and the other slotted switching link 15' arranged therebehind is shown by dashed lines. During the movement of the operating member 3 in the two directions, i.e., in particular, during the pulling and during the pushing of the switching rocker 3, comparable force-travel characteristics with positive and/or negative force values are thereby produced for the operating member 3 as per FIG. 5.

Figure 3:
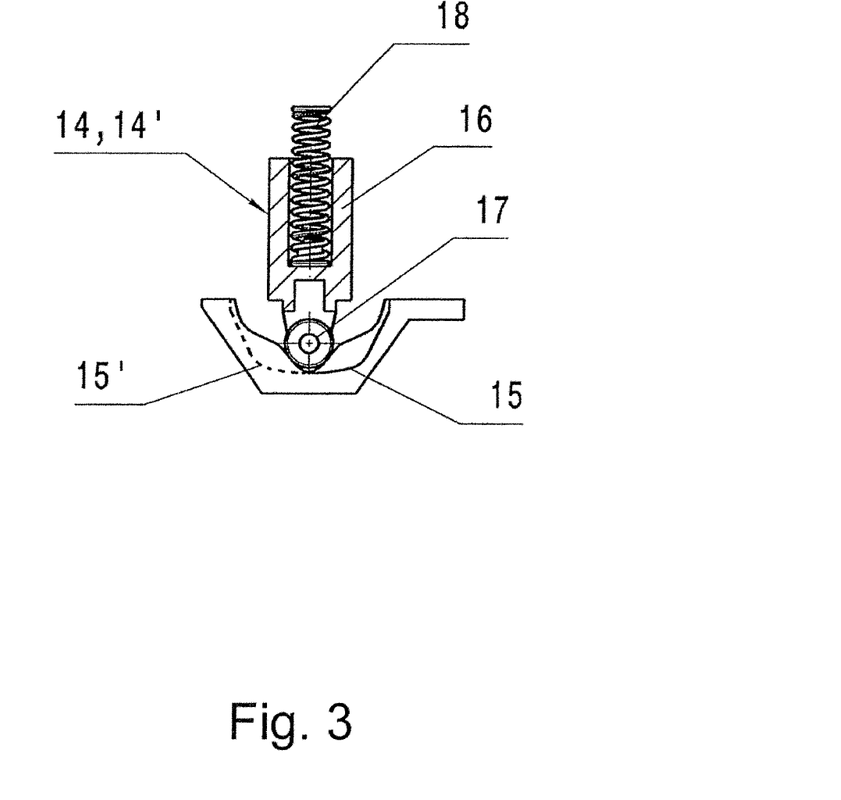
FIG. 3 shows the cutout of the detail from FIG. 2 in longitudinal section.

The operating element 14, 14' comprises a pin 16 arranged movably with respect to the operating member 3, and also a movement element 17 which is mounted rotatably on the pin 16 on the side lying opposite the operating member 3, as can be gathered from FIG. 3. The movement element 17 can be a roller, a ball or the like. The movement element 17 lies against the slotted switching link 15, 15' by means of the elastic force. The elastic force is generated here by a compression spring 18 arranged on the pin 16.

Figure 4:
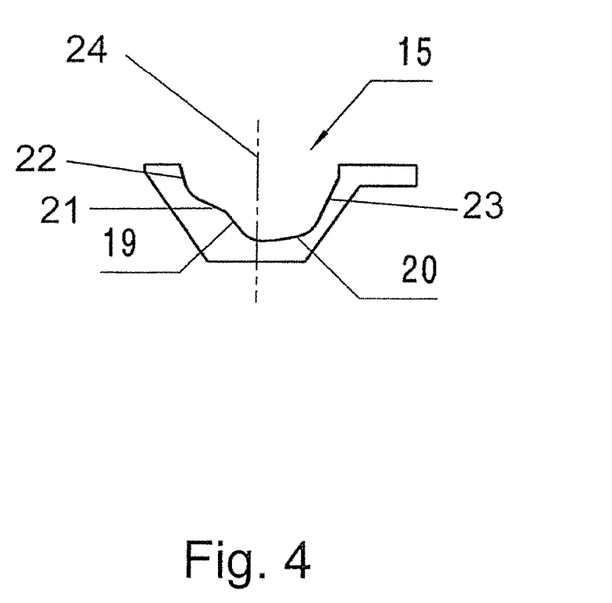
FIG. 4 shows a further cutout of the detail from FIG. 3.

As is furthermore seen in FIG. 4, the slotted switching link 15 has a rising flank 19. Furthermore, the slotted switching link 15 comprises a substantially flat track 20 which has a smaller slope than the rising flank 19. On the side facing away from the flat track 20, the rising flank 19 of the slotted link 15 merges into a more shallow flank 21 and subsequently into a steeper flank 22. Specifically in such a manner that, in the switching position assigned to the more shallow flank 21, a reduced resetting force is generated, as can be seen with reference to the return of the resetting force from $F_1$ to $F_2$ in the switching position between the travel $s_1$ and $s_2$ for the operating member 3 according to FIG. 5. A further movement of the operating member 3 beyond the switching position is prevented by the greatly rising resetting force brought about by the steeper flank 22. Furthermore, the flat track 20 on the side lying opposite the rising flank 19 merges into an in turn steep flank 23, and therefore the movement of the operating member 3 in the direction opposed to the respective switching position is limited.

The further slotted switching link 15' is configured in the same manner as the slotted link 15, but, as already mentioned, the two slotted links 15, 15' are arranged approximately in a mirror-inverted manner with respect to each other along the line of symmetry 24, which is shown in FIG. 4, with respect to the center of the flat track 20, as can be seen on the basis of FIG. 2. For the inoperative position or zero position of the operating member 3, use is in each case made, according to FIG. 3, of one of the flanks 19 of the two individual slotted switching links 15, 15', specifically by the respective movement element 17 lying against the respective rising flank 19. Owing to the fact that, consequently, in the inoperative position both the movement element 20 of the operating element 14 lies against the rising flank 19 in the slotted link 15 and the movement element 20 of the operating element 14' lies against the rising flank 19 in the slotted link 15', a particularly stable inoperative position is achieved. The transition between the flat track 20 and the rising flank 19 and also the steep flank 23, and the further transitions between the flanks 19, 21, 22 are in each case rounded, as a result of which a merely small generation of noise occurs during the movement of the operating member 3.

The present invention is not restricted to the exemplary embodiment described and illustrated. On the contrary, it also comprises all expert developments in the art within the scope of the present invention defined by the patent claims. The switch is suitable particularly for the operation of an electric/electronic parking brake in the motor vehicle. Of course, other switches having a switching rocker which uses a combination of slotted link and actuator and/or roller can also be configured in an advantageous manner according to the present invention.

LIST OF REFERENCE SIGNS

1: (electrical) switch
2: housing
3: operating member/switching rocker
4,5: direction (for the movement of the operating member)
6,7: contact system/switching element
8: (electrical) plug-in connection
9: tappet
10: lug
11: printed circuit board
12: contact surface/fixed contact
13: switching contact
14,14': operating element
15,15': slotted link/slotted switching link
16: pin
17: movement element
18: compression spring
19: (rising) flank (of slotted switching link)
20: flat track (of slotted switching link)
21: (more shallow) flank (of slotted switching link)
22: (steeper) flank (of slotted switching link)
23: (steep) flank (of slotted switching link)
24: line of symmetry

The invention claimed is:

1. An electrical switch, comprising an operating member that is movable from an inoperative position into a switching position and a contact system, wherein the operating member interacts in a switching manner with the contact system in the switching position, and wherein the operating member interacts via a first operating element, which is loaded with an elastic force, with a first slotted switching link for generating a resetting force during the movement of the operating member out of the inoperative position, wherein the electrical switch further comprises a second slotted switching link and a second operating element for the second slotted switching link arranged on the operating member in such a manner that each of the two operating elements interacts with the respective slotted switching link in the inoperative position and/or during the movement of the operating member out of the inoperative position, each of the operating elements comprising a pin arranged movably with respect to the operating member and a movement element having a radius, the movement element is mounted on the pin on a side lying opposite the operating member, whereby the movement element lies against the slotted switching link by means of the elastic force, each slotted switching link has rising flanks on opposite sides of the pin, which has a longitudinally extending center line that forms a line of symmetry between one side and an other side of the slotted switching link, such that the rising flank on the one side of the slotted switching link has a rising slope that is at an angle from the line of symmetry, a shallow slope that is at an angle from the line of symmetry that is greater than the angle of the rising slope and a steeper slope that is at an angle from the line of symmetry that is less than the angle of the rising slope, and the rising flank on the other side of the slotted switching link has a flat slope that is at an angle from the line of symmetry and a steep slope that is at an angle from the line of symmetry that is less than the angle of the flat slope, with the respective slopes of the rising flanks extending in that order away from the line of symmetry, such that each respective slope is connected to an immediately adjacent slope via a transition region having a radius that is greater than the radius of the movement element.

2. The electrical switch as claimed in claim 1, wherein the operating member is movable in two mutually opposed directions by pulling and/or pushing, starting from the inoperative position, for the operation thereof, and wherein the slotted switching links are designed in an opposed manner with respect to each other, such that, during the pulling and during the pushing of the operating member, comparable force-travel characteristics with positive and/or negative force values arise for the operating member.

3. The electrical switch as claimed in claim 1, wherein the elastic force is generated by a compression spring arranged on the pin.

4. The electrical switch as claimed in claim 1, wherein one of the rising flanks is used for the inoperative position of the operating member by the respective movement element lying against the respective rising flank.

5. The electrical switch as claimed in claim 1, further comprising a housing in which the operating member is mounted movably in and/or on, and wherein the operating member acts in a switching manner on the contact system in the switching position by means of a tappet or lug.

6. The electrical switch as claimed in claim 5, wherein the contact system is arranged on a printed circuit board, wherein the printed circuit board is located in the housing, and wherein an electrical plug-in connection is arranged on the printed circuit board for transmitting the switching signals generated during the switching of the contact system.

7. The electrical switch as claimed in claim 6, wherein the contact system comprises at least one contact surface on the printed circuit board as a fixed contact, and also a switching contact which interacts with the fixed contact and is configured in the manner of a switching mat, and/or comprises an electrical switching element arranged on the printed circuit board.

8. An electric parking brake for a motor vehicle comprising the electric switch of claim 1.

9. The electrical switch as claimed in claim 1, wherein the operating member is movable from the inoperative position into the switching position in the manner of a rocker.

10. The electrical switch as claimed in claim 2, wherein the slotted switching links are opposed in a mirror-symmetrical manner with respect to each other.

11. The electrical switch as claimed in claim 1, wherein the movement element is a roller or a ball.

12. The electrical switch as claimed in claim 6, wherein the plug-in connection projects out of the housing for the connection of a plug.

13. The electrical switch as claimed in claim 7, wherein the electrical switching element is a microswitch or a snap-action switch.

14. The electrical switch as claimed in claim 1, wherein the movement element is mounted rotatably on the pin.

* * * * *